(12) United States Patent
Ogawara et al.

(10) Patent No.: US 10,077,827 B2
(45) Date of Patent: Sep. 18, 2018

(54) LOCKUP APPARATUS FOR TORQUE CONVERTER

(71) Applicant: UNIPRES CORPORATION, Yokohama-shi, Kanagawa (JP)

(72) Inventors: Ryota Ogawara, Fuji (JP); Yoshinori Hyodo, Fuji (JP)

(73) Assignee: UNIPRES CORPORATION, Yokohama-Shi (JP)

( * ) Notice: Subject to any disclaimer, the term of this patent is extended or adjusted under 35 U.S.C. 154(b) by 27 days.

(21) Appl. No.: 15/293,678

(22) Filed: Oct. 14, 2016

(65) Prior Publication Data
US 2017/0159785 A1 Jun. 8, 2017

Related U.S. Application Data

(63) Continuation of application No. PCT/JP2015/065024, filed on May 26, 2015.

(30) Foreign Application Priority Data

May 30, 2014 (JP) ................ 2014-112175

(51) Int. Cl.
F16H 45/02 (2006.01)
F16F 15/123 (2006.01)
(52) U.S. Cl.
CPC ....... *F16H 45/02* (2013.01); *F16F 15/12353* (2013.01); *F16H 2045/0231* (2013.01)

(58) Field of Classification Search
None
See application file for complete search history.

(56) References Cited

U.S. PATENT DOCUMENTS

| | | | |
|---|---|---|---|
| 7,585,226 B2* | 9/2009 | Uhler | F16F 15/1232 192/205 |
| 2012/0217113 A1 | 8/2012 | Kawahara et al. | |
| 2013/0233665 A1* | 9/2013 | Vanni | F16D 33/18 192/3.28 |
| 2015/0354665 A1* | 12/2015 | Asai | F16H 45/02 464/68.9 |

FOREIGN PATENT DOCUMENTS

| | | |
|---|---|---|
| JP | 2010-038218 A | 2/2010 |
| JP | 2013-087827 A | 5/2013 |

* cited by examiner

*Primary Examiner* — Jacob S. Scott
*Assistant Examiner* — Timothy Hannon
(74) *Attorney, Agent, or Firm* — Foley & Lardner LLP (57) ABSTRACT

A lockup apparatus for a torque converter, which has a drive plate, a driven plate and damper springs connecting the drive plate and the driven plate in a rotating direction, is provided. Each damper spring has a pair of divided parts. An equalizer plate as an intermediate member is arranged so as to slide rotatably on bearing parts of the drive plate, and supporting parts fixed to the equalizer plate are arranged between the divided parts of the damper springs. A bearing part of the drive plate has an outer peripheral surface having an arc shape with a center or a curvature which is offset from a center of an arc shape of an inner peripheral surface of the equalizer plate.

2 Claims, 11 Drawing Sheets

PRIOR ART

LOCKUP APPARATUS FOR TORQUE CONVERTER

TECHNICAL FIELD

The present invention relates to a lockup apparatus for a torque converter and, in particular, to an improvement, in the torque converter, of a mechanism for centering an intermediate member (equalizer plate) with respect to an inlet rotating member (drive plate).

BACKGROUND TECHNOLOGY

In a torque converter provided with a lockup mechanism, a lockup apparatus has conventionally been employed for reducing a variation in a rotating movement when a lockup operation is carried out. Such a lockup apparatus is provided with a drive plate (inlet rotating member), which is connected to a piston plate and has a plurality of circumferentially and equally spaced bearing parts. A damper spring is of so-called divided type provided with a plurality of such damper springs is provided, each of which is constructed from a pair of divided parts connected with each other in rotating direction. Each damper spring has paired ends, which are arranged between opposed end faces of the bearing parts of the drive plate located adjacent with each other in a circumferential direction of the drive plate. An equalizer plate (intermediate member) is formed with supporting parts extending between the divided parts in each of the damper springs in a manner that the equalizer plate effects a rotating movement on the surfaces of the bearing parts of the drive plate in the circumferential direction. A driven plate (outlet rotating member) is connected to a hub and is formed with engaging parts extending between circumferentially opposed ends of the respective bearing parts of the drive plate. A power transmission to the driven plate from the drive plate is obtained by a circumferential engagement of the engaging parts with the opposed ends of the damper springs (spring retainers) in either direction of relative rotating movement of the driven plate with respect to the drive plate as caused by a torque fluctuation. During the power transmission, an elasticity of the damper springs effects a function to reduce the fluctuation in the rotating movement. The resultant deformation of the damper springs causes the equalizer plate to be rotated while effecting sliding movement on the outer peripheral surfaces of the bearing parts of the drive plate, so that deformations between the divided parts in the respective damper springs are equalized. As to the lockup apparatus of this kind, refer Patent Document No. 1.

PRIOR ARTS DOCUMENTS

Patent Documents

Patent Document No. 1: Un-Examined Japanese Patent Publication No. 2013-87827

SUMMARY OF INVENTION

Problems to be Solved by the Invention

Each of the damper springs is of a divided structure in the circumferential direction and the supporting parts of the equalizer plate extend radially inwardly in a manner that the supporting parts are located between the divided spring parts. The equalizer plate is always subjected to a centrifugal force as generated by its rotating movement, to which centrifugal force component forces of the springs are added, which urges the equalizer plate to be deformed in the radial outward directions at the supporting parts thereof. When the relative rotating movement (torque) is increased, the deformation of the damper springs is also increased, as a result of corresponding increase in the component force of the spring forces as caused by correspondingly increased compression of the damper springs. Conventionally, the supporting part of the equalizer plate has an outer peripheral surface of an arc shape, the central axis of which arc shape is common with that of the inner peripheral surface of the equalizer plate. The radially outwardly directed deformation of the equalizer plate at its supporting parts thus causes the equalizer plate to effect point like contacts with respect to the outer peripheral surfaces of the bearing parts of the drive plate, resulting in a generation of abrasions. In addition, a localized galling by the circumferential edges of the bearing parts of the drive plate as well as sliding resistance of the equalizer plate to the drive plate were, also, caused thereby.

The present invention is induced by theses problems and aims to obtain a smooth relative movement of the equalizer plate with respect to the drive plate irrespective of the deformation of the equalizer plate.

Means for Solving the Problems

A lockup apparatus according to the present invention is of a type that is arranged between a piston plate and a hub of a torque converter and is characterized by that the lockup apparatus includes: an inlet rotating member (drive plate) fixed to the piston plate and having a plurality of circumferentially equally spaced bearing parts; damper springs, each having a pair of divided parts connected in a direction of a rotating movement, the damper spring having paired ends arranged between opposed end faces of the bearing parts located adjacent in the circumferential direction of the inlet rotating member; an intermediate member (equalizer plate) having supporting parts extending between the divided parts of the respective damper springs and facing the outer peripheral surfaces of the bearing parts of the inlet rotating member, the intermediate member being guided in rotating manner by the bearing parts, the intermediate member effecting a rotating movement together with the deformation of the damper springs, and: an outlet rotating member (driven plate) connected to the hub and having engaging parts extending between the end surfaces of the respective bearing parts of the inlet rotating member, the engaging parts effecting engagements with the damper springs in either rotating directions of the outlet rotating member, thereby obtaining a transmission of the power (torque) from the inlet rotating member; the outer peripheral surface of the bearing part of the inlet rotating member being of such a shape that the guiding function of the intermediate member is maintained while preventing a surface pressure from being locally increased irrespective of a deformation of the intermediate member during the relative rotating movement, as generated at the supporting parts under the influences of centrifugal forces as well as radially outwardly directed component forces of the compressed springs. The outer peripheral surface of the bearing part of the inlet rotating member may be of an arc shape, of which center of the curvature is radially outwardly spaced from the center of the curvature of the inner peripheral surface of the intermediate member.

Above mentioned shape of the outer peripheral surface of the bearing part of the inlet rotating member is such a shape that the inlet rotating member makes a contact with the inner peripheral surface of the intermediate member at the central position along the circumferential direction and that the more a position of the outer peripheral surface is spaced from the central position in the circumferential direction, the more it is spaced radially inwardly with respect to the circle passing the central position, of which central axis coincides with the axis of the rotating movement. In order to obtain such a shape of the outer peripheral surface of the bearing part of the inlet rotating member that the inlet rotating member makes a contact with the inner peripheral surface of the intermediate member at the central position along the circumferential direction and that the more a position of the outer peripheral surface is spaced from the central position in the circumferential direction, the more it is spaced radially inwardly from a circle passing the center position, of which central axis coincides with the axis of the rotating movement, the outer peripheral surface of the bearing part of the inlet rotating member forms a circular arc shape and the central axis of the curvature of the circular arc shape is spaced radially outwardly from the central axis of the arc shape of the inner peripheral surface of the intermediate member.

Effects of the Invention

With respect to the deformation of the intermediate member, a surface to surface contact of the inner surface of the intermediate member with respect to the bearing parts of the inlet rotating member is obtained, thereby preventing a surface pressure from being locally increased, resulting in a reduction of abrasions. Furthermore, the shape of the outer peripheral surface of the bearing part of the inlet rotating member is matched with the deformation of the intermediate member, thereby obtaining a reduced abrasion of the intermediate member by galling. Thanks to a smooth slide movement of the intermediate member on the outer peripheral surfaces of the bearing parts, a desired deformation of the damper springs in accordance with the fluctuation of the rotating movement is obtained, resulting in an improvement in a damping characteristics. Due to the prevention of the local increase in the surface pressure, an equalization of stress as generated at the inlet rotating member as well as at the intermediate member are realized. In a structure of the bearing part formed by bending a straight wall portion of the intermediate member while being connected to the straight wall portion via a recessed portion, the reduction of the radius of the curvature of the bearing part makes the portion of the straight wall connecting to the bearing part to be lowered further, which allows the radius of the recessed portion to increase, resulting in a reduction of an effect of stress concentration at the recessed portion as a structural weak point.

FORMS FOR PRACTICING THE INVENTION

Figure 1:
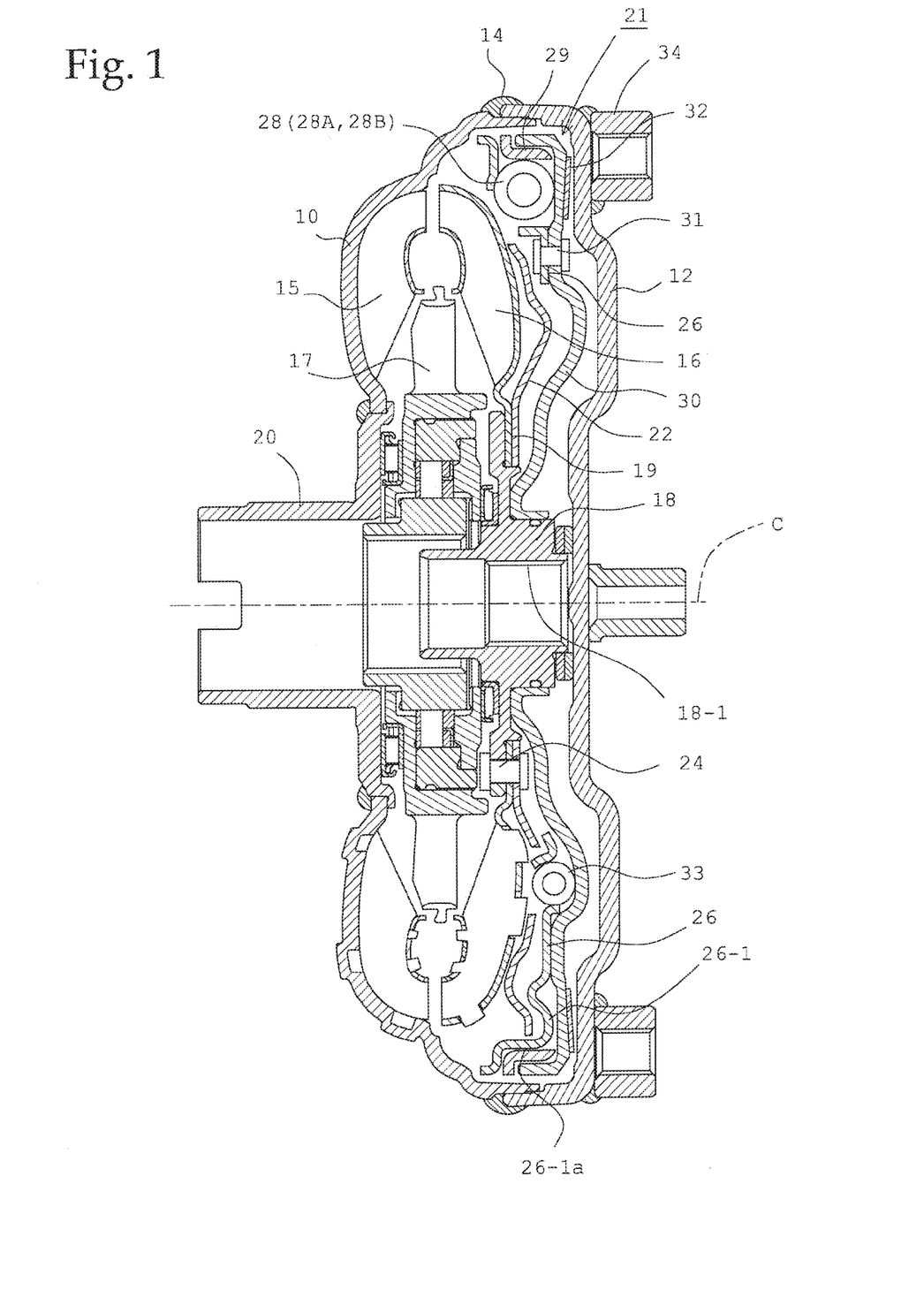
FIG. 1 is a longitudinal cross sectional view of a torque converter according to the present invention.

In FIG. 1 illustrating, in cross section along a longitudinal axis, a torque converter, a reference numeral 10 denotes an impeller shell as a press molded product of a steel plate. A front cover 12 as a press molded product of a steel plate as similar to the impeller shell 10 is connected to the latter at a welded portion 14. Inside the impeller shell 10, the basic parts constructing the torque converter including an impeller 15, a turbine 16 and a stator 17 are arranged in a known manner. The turbine 16 is connected to a turbine support plate 19 on a hub 18, which forms splines 18-1 at an inner peripheral surface thereof. Furthermore, a sleeve 20 is fixed to the inner periphery of the impeller shell 10, to which sleeve a not shown input shaft of a transmission is, as is known, inserted from the left-handed side of the drawing in a manner that the leading end of the input shaft is fitted to the splines 18-1. A lockup apparatus 21 is provided with a driven plate 22 as an outlet rotating member fixedly connected to the hub 18 together with the turbine supporting member 19 by rivets 24, with a drive plate 26 as an inlet rotating member, with a plurality of damper springs 28 arranged circumferentially spaced in a known manner for obtaining a circumferential resilient connection between the driven plate 22 and the drive plate 26 and with a equalizer plate 29 as a intermediate member moved in accordance with a deformation of the damper springs 28 as generated. The drive plate 26 is connected to a piston plate 30 by rivets 31, which piston plate is slidably movable on the hub 18. A clutch facing (friction material) 32 is arranged on the outer peripheral surface of the piston plate 30 spaced from the lockup apparatus 21 in a manner that clutch facing 32 is opposed with the front cover 10 at a small gap. In addition to the damper springs 28 at the outer circumferential side, damper springs 33 are arranged on the inner circumferential side for a circumferential resilient connection between the driven plate 22 and the drive plate 26. The damper springs 33 function to damp the fluctuation of the rotating movement at the damping area of elastic modulus higher than that at the damping area by the damper springs 28. Connected to the outer surface of the front cover 12 is boss nuts 34, to which boss nuts a not shown rotating plate rotating integrally with an engine outlet shaft in a known manner is fixedly connected.

Figure 2:
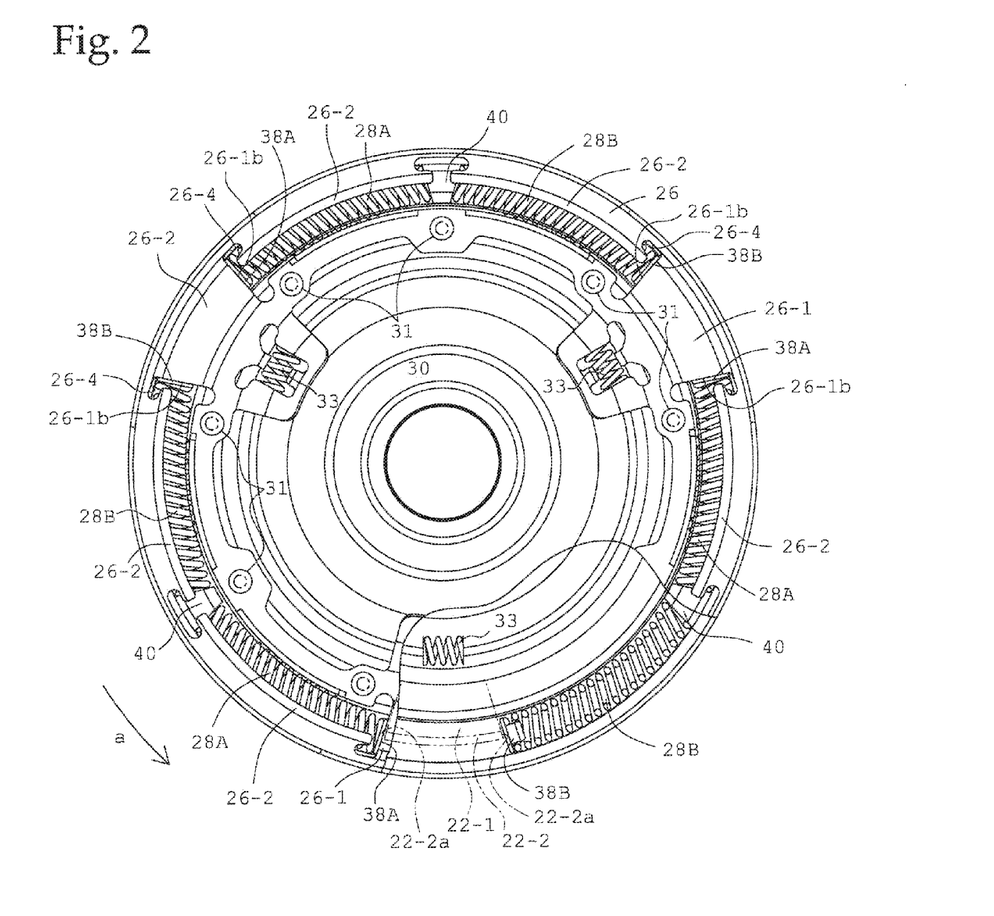
FIG. 2 is a front view of a lockup apparatus of the torque converter according to the present invention and a driven plate is shown partially by dotted lines.

In a detailed construction of the lockup apparatus 21 now be explained, FIG. 2 is a front elevational view of the lockup apparatus 21 seen from the driven plate 22 toward the piston plate 30. The damper spring 28 at the outer peripheral side has a pair of divided parts 28A and 28B, which are connected with each other byway of a supporting part 40 of the equalizer plate 20, as will be explained later. Three sets of such damper springs 28 constructed by these divided parts are arranged spaced along the circumferential direction. Note: when a term "damper spring" is merely referred, it means the damper spring 28 constructed by its paired divided parts 28A and 28B, which are connected with each other by way of the corresponding supporting part 40. Regarding the damper springs 33 at the inner peripheral side, each of them is a mono block type and three of these damper springs 33 are arranged circumferentially equally spaced. Below, constructions of each of the rotating members constructing the lockup apparatus will be respectively explained.

Figure 3:
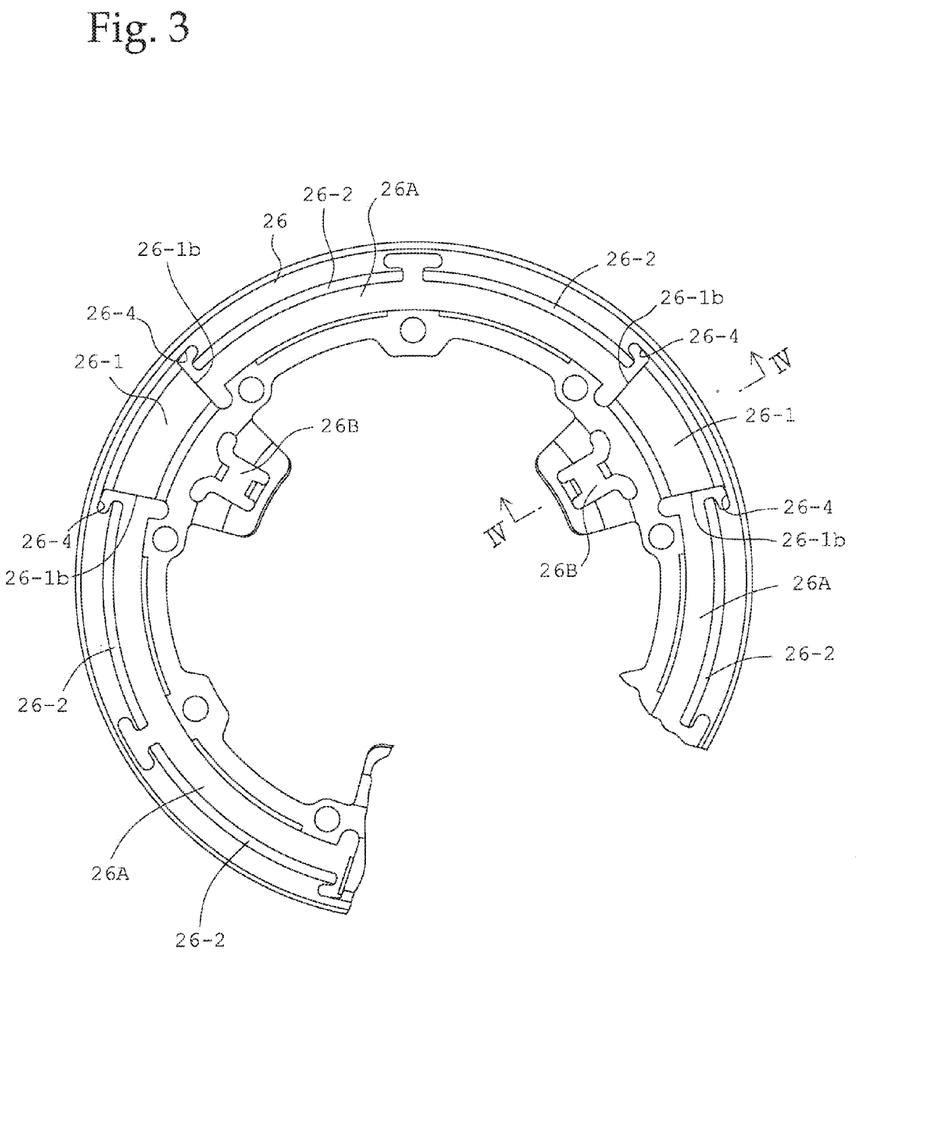
FIG. 3 is a partial front elevational view of a drive plate as a separated part.
Figure 4:
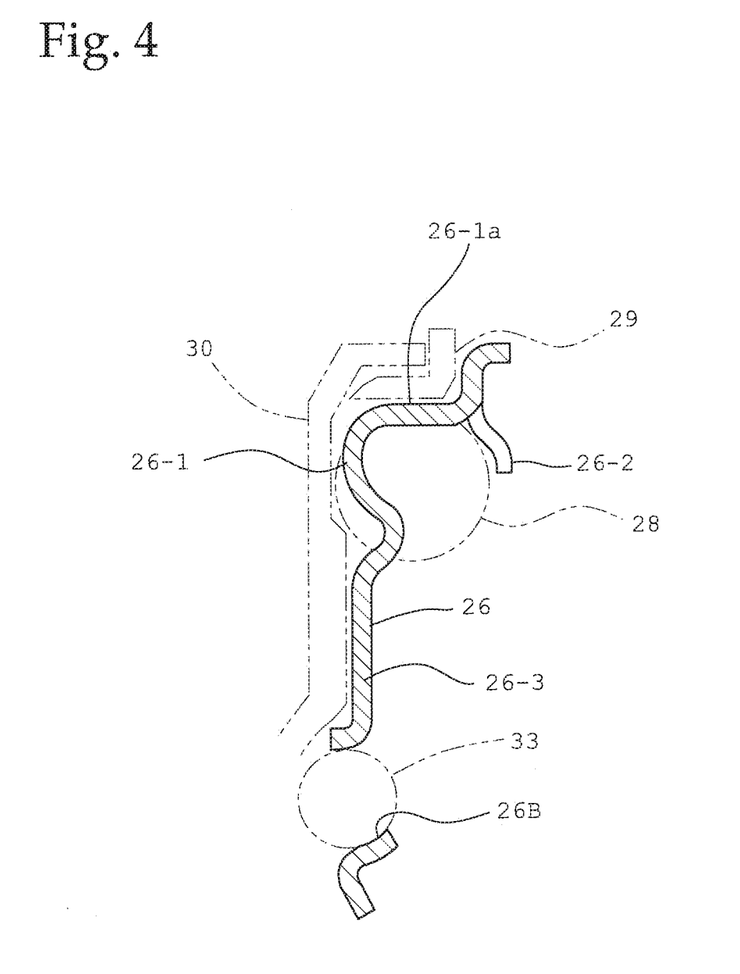
FIG. 4 is a cross sectional view of the drive plate at its outer peripheral part along IV-IV line in FIG. 3 and a damper plate and an equalizer plate are shown by alternate long and two short dashes lines.
Figure 6:
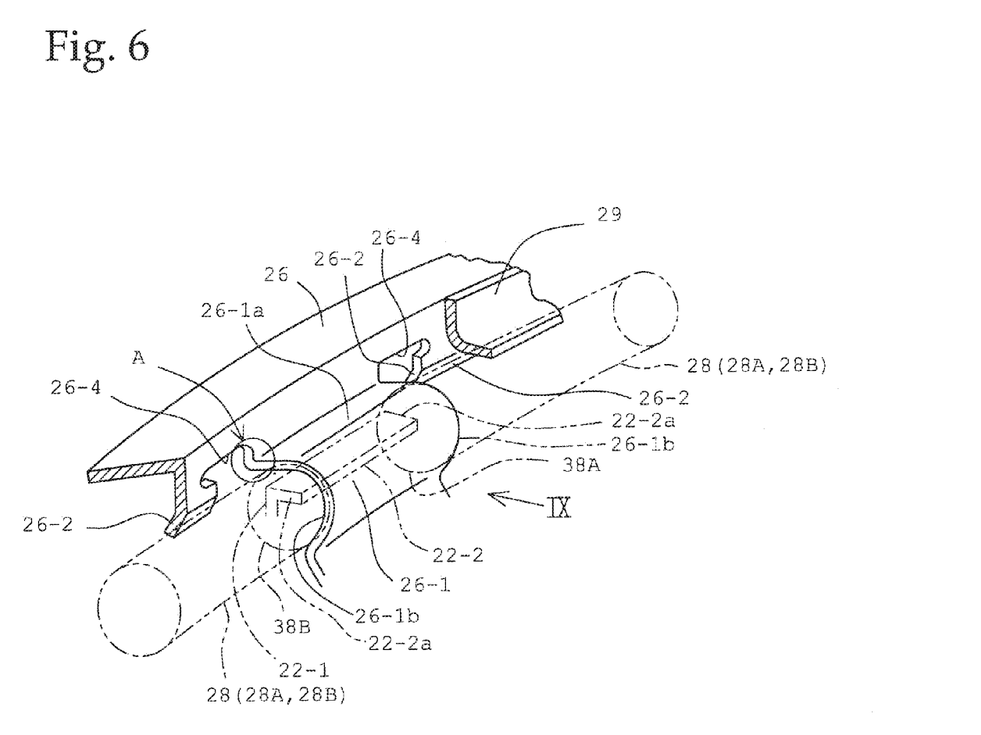
FIG. 6 is a schematic perspective view of a bearing part of the drive plate and illustrates also a positional relationship with respect to the damper spring and the drive plate.

Referring FIG. 3 illustrating a front elevational view of the drive plate 26 as a separated part, it includes window parts 26A for holding the respective damper springs 28 at the outer peripheral side and window part parts 26B for holding the respective damper springs 33 at the inner peripheral side. Between window parts 26A at the outer peripheral side, the drive plate 26 is formed with bearing parts 26-1 as shown in FIGS. 4 and 6 as bent and curved portions thereof extending toward the side of the piston plate 30, i.e., toward the backside of the paper surface of FIG. 3. The bearing parts 26-1 are, at the outer peripheral surfaces 26-1a shown at the top in FIG. 6, arranged to face the inner surface of the equalizer plate 29. The bearing parts 26-1 extend circumferentially as shown FIGS. 3 and 6. The drive plate 26 is formed with such bearing parts 26-1 at circumferentially equally spaced three locations, so that a centering of the equalizer plate 29 is obtained. As shown in FIG. 2, spring retainers 38A and 38B are fitted to the ends of the damper spring 28 and the damper spring 28 engages with opposed end surfaces 26-1b of the bearing parts 26-1 located adjacent in the circumferential direction of the drive plate 26. As shown in FIG. 3, along the window parts 26A, the drive plate 26 is formed with roof parts 26-2 extending to the side of the drive plate 26 away from the piston plate 30, as also seen from FIGS. 4 and 6. The roof parts 26-2 support the top surfaces of the damper springs 28 curved upwardly in a manner that the roof parts 26-2 function to hold the damper springs 28. FIG. 4 illustrates a positional relationship of the damper spring 28 with respect to the bearing parts 26-1 and the roof parts 26-2. As already explained with reference to FIG. 1, the drive plate 26 is connected to the piston plate 30 by the rivets 31, which is also shown in FIG. 2.

Figure 5:
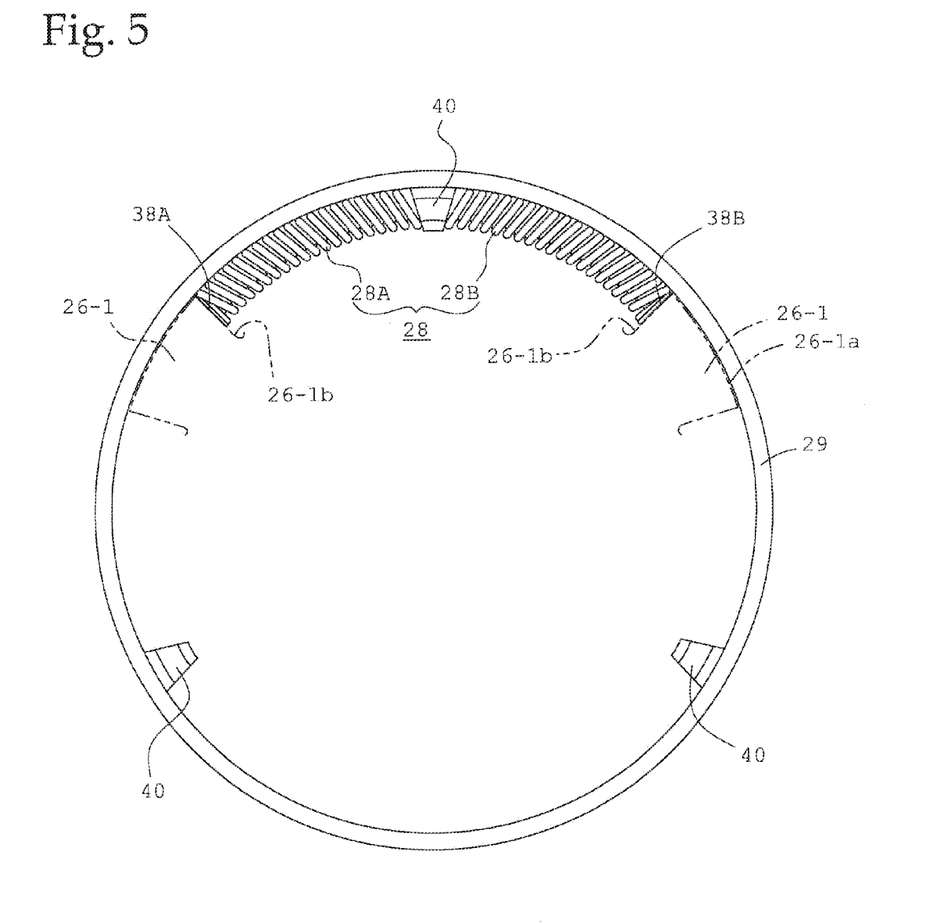
FIG. 5 is a front elevational view of the equalizer plate as a separated part and illustrates also a positional relationship thereof with respect to the damper spring and the drive plate.
Figure 7:
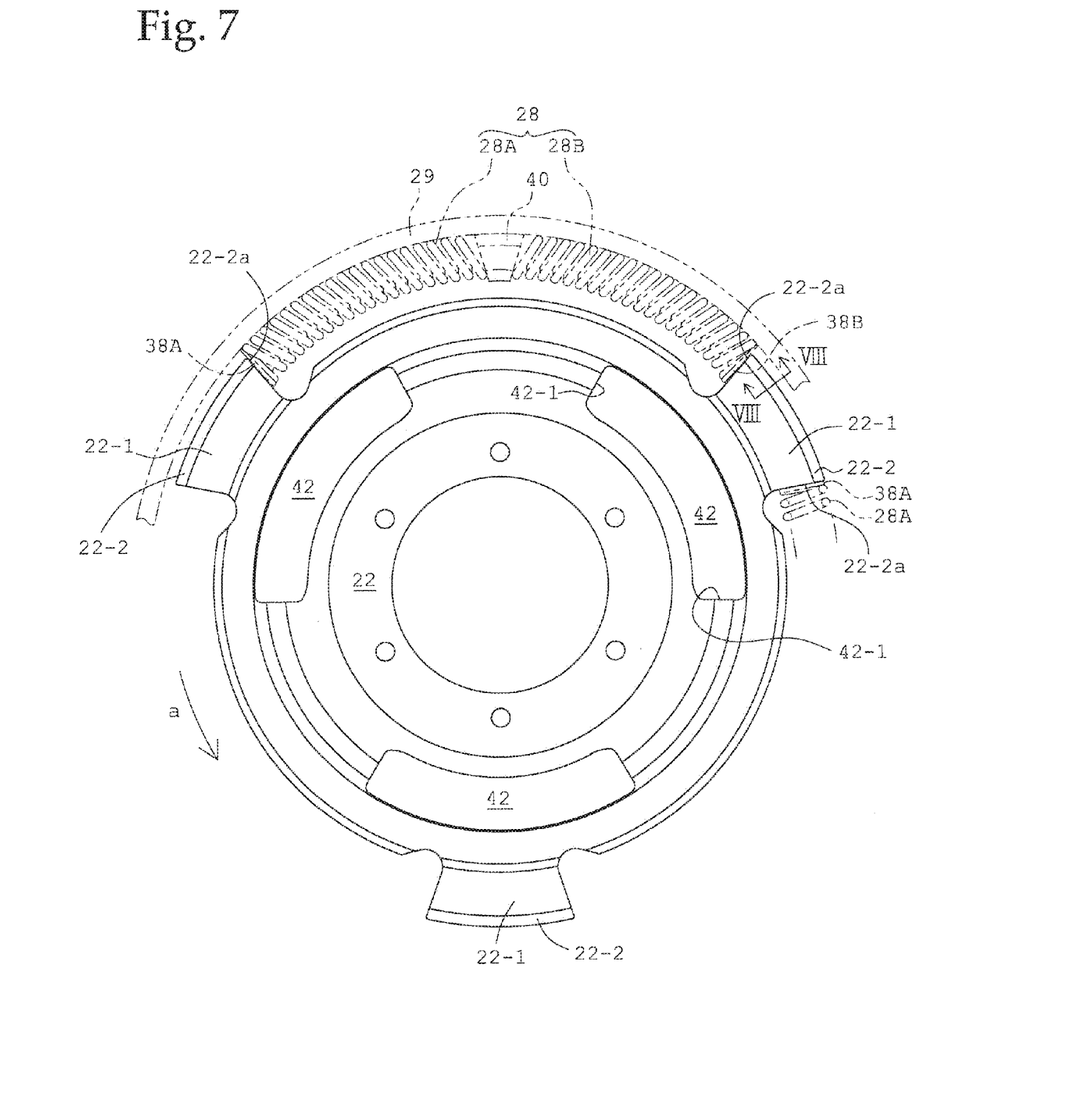
FIG. 7 is a front elevational vies of the driven plate and illustrates a positional relationship with respect to the damper spring and the equalizer plate.

FIG. 5 illustrates an elevational view of the equalizer plate 29 in separated condition and is for explaining a positional relationship of the damper springs 28 with respect to the equalizer plate 29. In FIG. 5, only one damper spring 28 among totally three such damper springs is shown, each of which is constructed by a pair of divided parts 28A and 28B as already explained. The equalizer plate 29 is generally of a circular annular shape and supporting parts (spring separation parts) 40 of a conically projected shape are fixed to the inner peripheral surface of the equalizer plate 29 by means of, for example, integral formation or welding. FIG. 2 shows partially the equalizer plate 29 and illustrates the supporting parts also. The supporting parts 40 extend radially inwardly between the divided parts 28A and 28B of the damper springs 28 in a manner that the spring parts 28A and 28B are separated. The FIGS. 2, 5, and 7 show a neutral condition where any relative rotating movement or torque does not exist between the drive and the driven members. In this neutral condition, as clearly understood by FIGS. 2 and 5, the opposed ends of each of the damper springs 28, which is constructed by the divided parts 28A and 28B adjoining with each other by way of the corresponding supporting part 40, are under a press contacted condition with the opposed end surfaces of the bearing parts of the drive plate 26 adjoining in the circumferential direction by way of the respective spring retainers 38A and 38B. As a result, desired initial preset forces are generated in the damper springs 28. FIG. 6 is a schematic perspective view illustrating a positional relationship between the bearing part 26-1 of the drive plate 26, the damper springs 28 and the equalizer plate 29, at the neutral condition. The outer peripheral surfaces 26-1a of the bearing parts 26-1 of the drive plate 26 oppose the inner surface of the equalizer plate 29, so that the equalizer plate 29 moves on the outer peripheral surfaces 26-1a of the bearing surfaces 26-1a in conformity with an elastic displacement as caused in the damper springs 28. As shown in FIG. 5, the outer peripheral surfaces of the damper springs 28 are located along the inner peripheral surface of the equalize plate 29 at locations between the bearing parts 26-1 adjacent with each other in the circumferential direction. As shown in FIG. 6, the damper springs 28 extend circumferentially while being in contact with the roof portions 26-1 along with each other. As already explained above with reference to FIG. 2, the spring retainers 38A and 38 at the ends of the damper springs 28 contact with the circumferentially spaced end surfaces 26-1b of the bearing parts 26-1, which cases the ends of the damper springs 28 to be stopped in an engaged manner, resulting in the desired initial preset forces generated in the respective damper springs 28. In addition, the inner surface of the equalizer plate 29 extends in the circumferential direction along the upper surfaces of the damper springs 28 while opposing the outer peripheral surfaces 26-1a of the bearing parts 26-1 of the equalizer plate 29 (shown at the top in FIG. 6), so that a desired positioning, i.e., a centering of the equalizer 29 by the bearing parts 26-1 of the drive plate 26 is obtained. Such centering function of the equalizer plate 29 by means of the bearing parts 26-1 will be fully explained as to the prior art by referring to FIG. 9 as well as the present invention by referring to FIG. 10. Due to the fact that the supporting parts 40 function to transmit the deformation of the damper springs 28 to the equalizer plate 29 as will be seen from FIG. 5, a slide movement of the equalizer plate 29 is obtained on the outer peripheral surface 26-1a of the bearing part 26-1 in accordance with the deformation of the damper springs 29.

Figure 8:
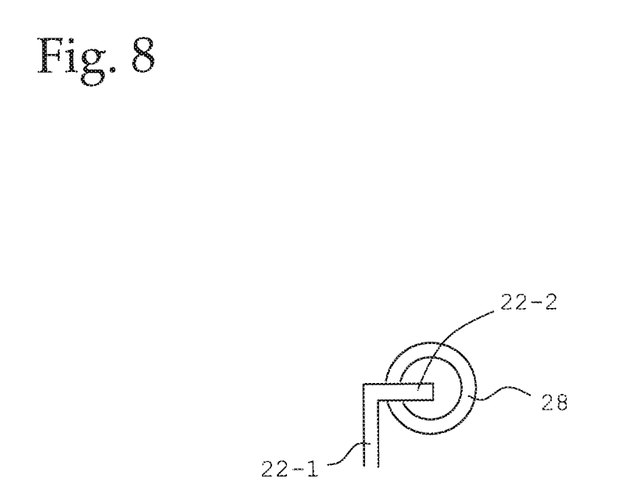
FIG. 8 is a view illustrating a relationship between the driven plate and the damper spring along VIII-VIII lines in FIG. 7.

FIG. 7 is a front elevational view of the driven plate 22 as a separated part. The driven plate 22 is, along its outer periphery, formed with three radially projected parts 22-1, from which extend, axially, spring engaging parts 22-2, respectively in a manner that the spring engaging parts 22-2 are located between the spring retainers 38A and 38B faced with each other between the damper springs 28 which are located adjacent in the circumferential direction. FIG. 8 illustrates schematically a positional relationship of the spring engaging part 22-2 of the driven plate 22 with respect to the outer diameter of the damper spring 28. As shown in the perspective view in FIG. 6, the spring engaging part 22-1 extends into the receiving part 26-1 of the drive plate 26 at the rear side thereof, i.e., at the side of the drive plate spaced from the piston plate 30 in a manner that the spring engaging part 22-1 is located between the opposed retainers 38A and 38B of the damper springs 28 located adjacent in the circumferential direction. A length of the spring engaging part 22-2 in the circumferential direction is slightly shorter than the distance between the spring retainers 38A and 38B adjacent in the circumferential direction. As a result, in the neutral condition that the spring engaging member 22-2 is located between the spring retainers 38A and 38B adjacent with each other in the circumferential direction as shown in FIG. 6, a clearance of the spring engaging part 22-2 in the circumferential does not actually exist with respect to the spring retainer 38A nor 38B. As a result, an occurrence of a relative rotating movement even if it is of a small value causes the spring engaging parts 22-2 to be extended from the bearing parts 26-1 so as to be selectively engaged with the spring retainers 38A or 38B in accordance with the direction of the relative rotating movement, causing the damper springs 28 to be subjected to shrinkages under a compressed manner, thereby obtaining a power transmission between the drive plate 26 and the driven plate 22. A positional relationship of the driven plate 22 with respect to the spring engaging part 22-2 between the opposed spring retainers 38A and 38B of the damper springs 28 adjacent with each other in the circumferential direction is also shown in FIG. 2 by dot lines.

From the above explanation, one will understand the following manner of the transmission of rotating movements between the drive and driven members as explained below. Namely, in case of a relative rotating movement in a counter clockwise direction as shown by an arrow a in FIG. 2, the front sided respective end faces 26-1b of bearing parts 26-1 of the drive plate 26 in the rotating movement compress, via the respective spring retainers 38B, the damper springs 28. In other words, a relative rotating movement of the driven plate 20 in the clockwise direction is occurred, so that the spring engaging parts 22-1 are extended from the bearing parts 26-1 in the clockwise direction for obtaining an engagement with the spring retainers 38A, which results in a generation of compression forces in the damper springs 28. In short, a transmission of a power, i.e., a transmission of torque between the drive plate 26 and driven plate 22 is done while the damper springs 28 being accordingly compressively deformed. Contrary to this, in case of a relative rotating movement in the clockwise direction opposite to the arrow a in FIG. 2, the front sided respective end faces 26-1b of bearing parts 26-1 of the drive plate 26 in the rotating movement compress, now, via the spring retainers 38A, the damper springs 28. In other words, a relative rotating movement of the driven plate 20 in the counterclockwise direction is occurred, so that the spring engaging parts 22-1 are extended from the bearing parts 26-1 for obtaining an engagement with the opposite sided spring retainers 38B, which results in a generation of compression forces in the damper springs 28. Thanks to such spring forces as generated by the compressive deformations of the dampers springs 28 during the occurrence of the relative rotating movement it becomes to be possible to absorb a fluctuation in the rotating movement. By the deformations of the damper springs 28, a relative rotational movement of the equalizer plate 29, i.e., a slide movement of the equalizer plate 29 with respect to the bearing parts 26-1 of the drive plate, is obtained, which allows the amounts of the displacement to be equalized between the divided parts 28A and 28B of the damper springs 28. In addition, the driven plate 22 is, at its inner periphery, formed with the three window parts 42 as shown in FIG. 7, which cooperate with the respective inner damper springs 33, so that a function of the springs 33 is obtained for absorbing a fluctuation of rotating movement of a degree larger than the degree of fluctuation of rotational movement absorbed by the outer damper springs 28. In more detail, the window parts 42 is formed with inner edges 42-1 opposed with each other in the circumferential direction. When a relative rotating movement between the drive and driven members in one of circumferential directions exceeds the limit value, one of the inner edges 42-1 engages with the respective inner damper spring 33. Contrary to this, when the relative rotating movement between the drive and driven members in the opposite circumferential direction exceeds the limit value, the other inner edge 42-1 engages with the respective inner damper spring 33. In this way, the damping function by the inner damper springs 33 at their higher degree of damping modulus is obtained.

Figure 9:
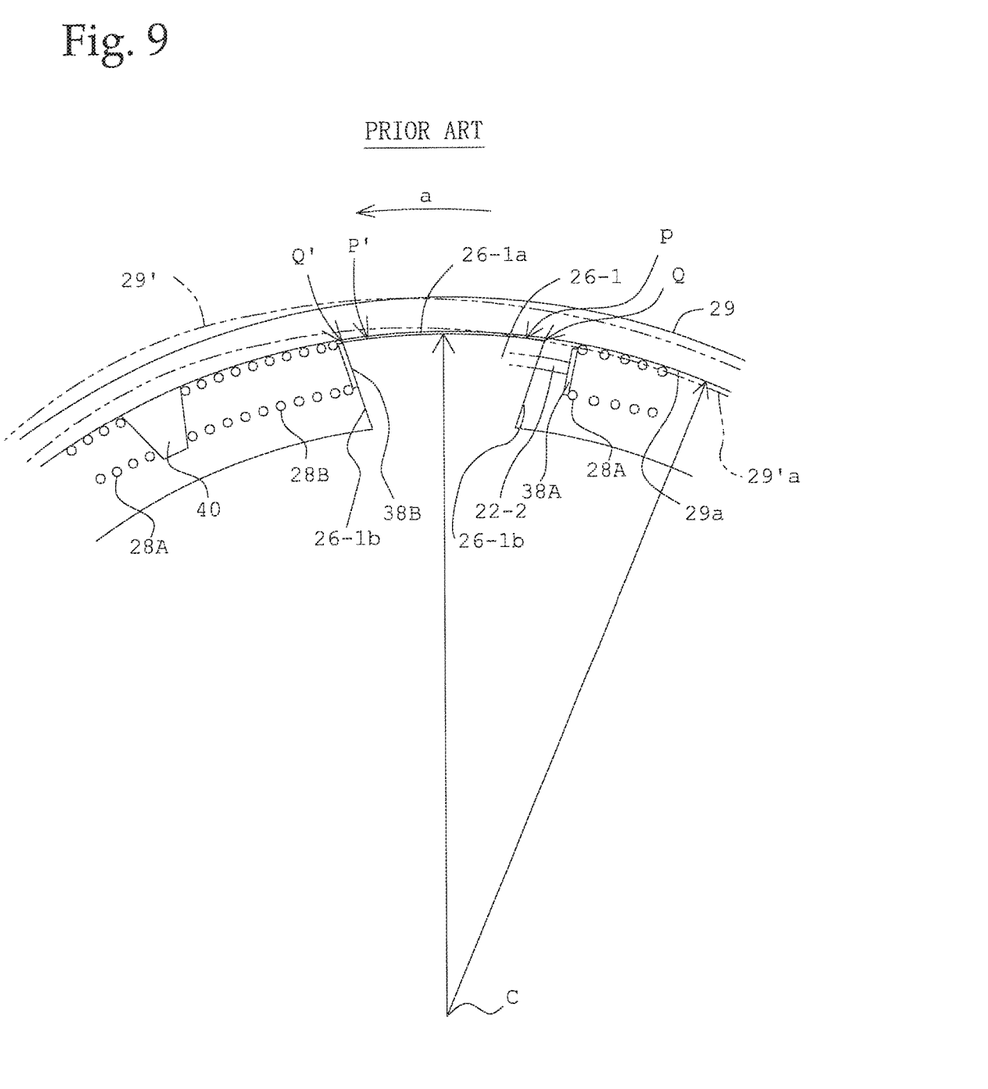
FIG. 9 illustrates a positional relationship between the bearing part of the drive plate and the equalizer plate viewed from an arrow line XI in FIG. 6 in the prior art.

The above construction of the lockup apparatus 21 is basically identical to that described in the Patent No. 1, which is suffered from drawbacks as will explained below. Referring to FIGS. 2, 5, 6 and 7, the apparatus is shown under a state where no relative rotating movement exists and the damper springs 28, i.e., the spring divided parts 28A and 28B are under slightly deformed conditions due to the initial set force as applied. A deformation of the damper springs 28 when a relative rotational movement is occurred generates spring forces, having radially outwardly directed components, which causes the equalizer plate 20 to be radially outwardly deformed at the at the intermediately located supporting parts 40, which may influence to a smooth slide movement of the equalizer plate 29 with respect to the bearing parts 26-1 of the drive plate 26 in accordance with the elastic deformation of the damper springs 28 as explained with reference to FIG. 2, et al. In operating area of a smaller relative rotating movement, the deformed forces as generated in the damper springs 28 are however not so large, so that resultant outward forces as the radially outwardly directed component forces of the spring deformation forces as generated at the supporting parts 40 are small. Thanks to the small spring component forces, the total radially outwardly directed deformation of the equalizer plate 29 is still small enough to maintain a smooth movement of the equalizer plate 29 on the bearing parts 26-1 of the drive plate 26 even when an additional deformation due to the effect of a centrifugal force is taken into consideration. This does not however apply in operating area of a larger relative rotating movement. Namely, FIG. 9 illustrates, along a line IX in FIG. 6, schematically, a positional relationship between the bearing part 26-1 of the drive plate 26 and the equalizer plate 29 during a large relative rotating movement in a counter clockwise direction as shown by the arrow a. The end surfaces 26-1b the bearing parts 26-1 of the drive plate 16 located at the front side in the direction of the rotating movement a maintains the contact with the spring retainers 38B on one hand and, on the other hand, the spring engaging parts 22-2 contact with the spring retainers 38A at the rear side in the direction of the rotating movement a, so that the damper springs 28, i.e., the divided spring parts 28A and 28B are strongly compressed. Due to resulting large spring forces generated in the damper springs 28, large radially directed component forces are thus generated in the equalizer plate 29 at the supporting parts 40, to which deformations under the effect of centrifugal force is added, so that the equalizer plate 29 is subjected to radially outwardly directed deformations at locations of contact with the supporting members 40 as illustrated by dotted lines 29' in an exaggerated manner. Due to the fact that the damper springs 28 are located at three circumferentially spaced locations as shown in FIG. 2, the equalizer plate 29 as subjected to the above mentioned larger deformations forms a curved triangle shape slightly different from a circle, which may be called as an "OMUSUBI" shape or Reuleaux triangle. In the prior art in FIG. 9, a construction for centering the equalizer plate 29 with respect to the bearing parts 26-1 of the drive plate 26 is that the outer peripheral surfaces 26-1a of the bearing parts 26-1 of the drive plate 26 have a central axis C, which conforms with that of the inner peripheral surface 29a of the equalizer plate 29. In this design of the prior art, so long as the equalizer plate 29 is under non deformed condition, a face-to-face contact arrangement at a desired clearance is obtained between the outer peripheral surfaces 26-1a of the bearing parts 26 of the drive plate 26 and the inner peripheral surface 29a of the equalizer plate 29, which results in a smooth relative slide movement of the equalizer plate 26 with respect to the bearing parts 26-1 of the drive plate 26. The above-mentioned radially outwardly directed deformation of the equalizer plate 29 as shown by the dotted lines 29' however causes the inner peripheral surface 29a' of the equalizer plate 29 as deformed to be locally contacted with the outer surfaces 26-1a of the bearing parts 26-1 of the drive plate 26 at locations P downstream from the supporting parts 40 in the direction a of the rotating movement, so that a local increase in surface pressure is generated, thereby occurring abrasion. In addition, the equalizer plate 29 is subjected to a galling by contacting with downstream edges Q of the bearing parts 26-1 of the drive plate 26 in the direction a of the rotating movement thereof, resulting also in an occurrence of the abrasion of the equalizer plate 29. Furthermore, the engagement to the edges Q of the bearing parts 26-1 of the drive plate 26 results in an increase in a resistance in the sliding movement of the equalizer plate 29 to the drive plate 26. Finally, the deformation of the equalizer plate 29 during the dynamic condition results in point to point contact between the drive plate 26 and the equalizer plate 29, which may generate a stress concentration at the points of the contact.

Figure 10:
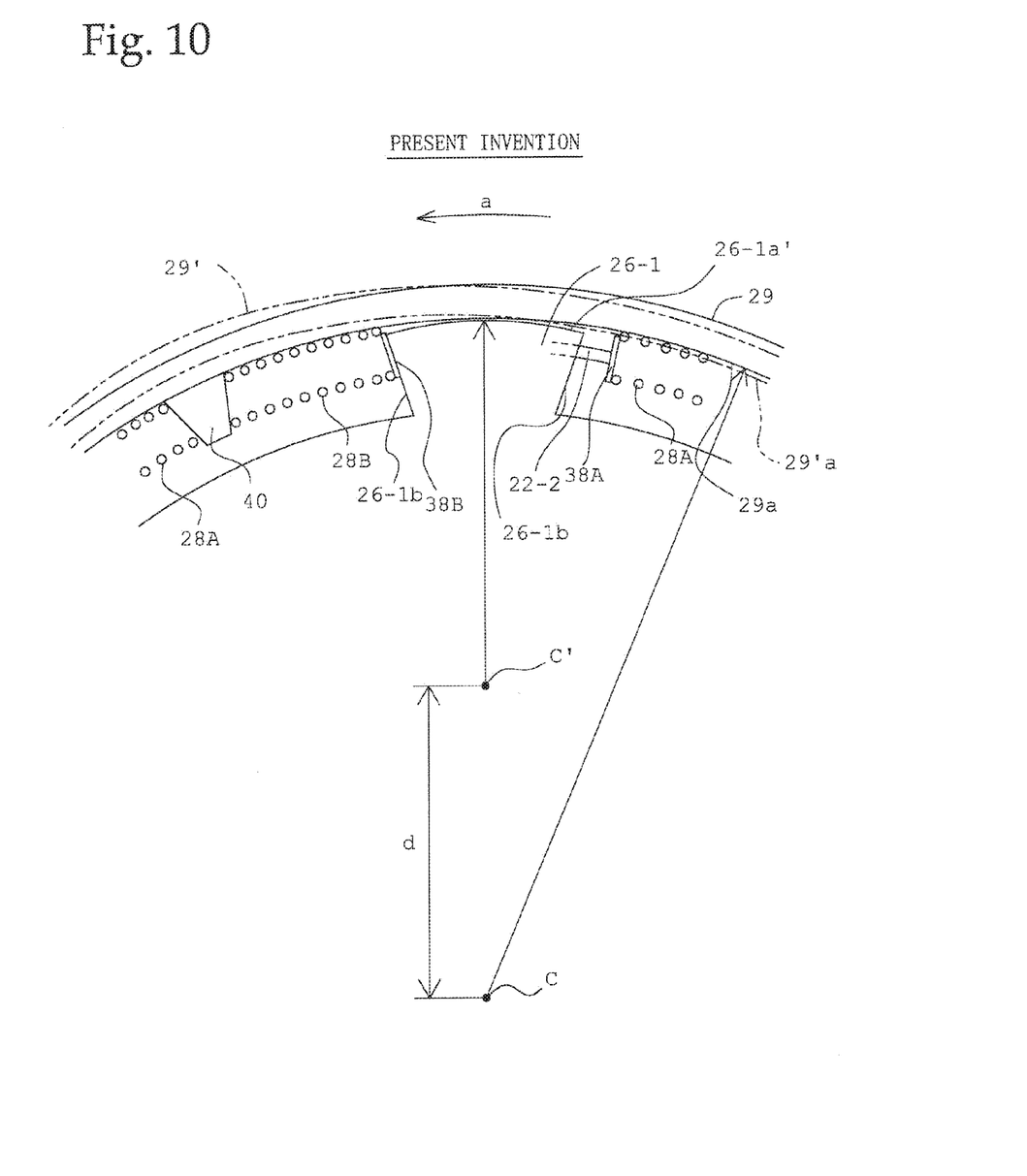
FIG. 10 is similar to FIG. 9 but illustrates a positional relationship between the bearing part of the drive plate and the equalizer plate viewed from the arrow line XI in FIG. 6 according to the present invention.

According to the present invention, in order to overcome the drawbacks in the prior art as shown in FIG. 9, an improved construction is provided for obtaining a centering of the equalizer plate 29 with respect to the bearing parts 26-1 of the drive plate 26. In the improved construction of the present invention as shown in FIG. 10, the outer peripheral surface 26-1a of the bearing parts 26-1 of the drive plate 26 has a center of the curvature, which is located at the point C', which point is, from the center of the rotating movement (the rotating axis C), spaced for a distance d radially outwardly from the center of the rotating movement, i.e., the rotating axis C. In other words, the bearing parts 26-1 of the drive plate 26 are formed with an formed outer surfaces 26-1a', of which radius of curvature is smaller than the radius of curvature of the inner peripheral surface 29a of the inner peripheral surface 29a of the equalizer plate 29. As a result, even in a situation of a large deformation of the shape of the equalizer plate 29 as shown by the lines 29' under the spring force plus the centrifugal force, a suitable clearance is maintained as to the outer peripheral surfaces 26-1a' of the bearing parts 26-1 of the drive plate 26 at the areas down stream from the respective supporting parts 40 in the direction of the rotating movement a with respect to the inner peripheral surface 29a of the equalizer plate 29. A modified structure for a substantial face-to-face contact to obtain an even contact at the inner peripheral surface is thus realized. As a result, a localized increase in the surface pressure is prevented and a reduction in the abrasion is realized. Furthermore, the radius of the curvature of the outer peripheral surface 26-1' of the bearing parts 26-1 of the drive plate 26, which function to support the equalizer plate 29, is adjusted to the actual deformation of the equalizer plate 29, i.e., the shape of the inner peripheral surface 29a when being subjected to the rotating movement, which results in a reduction in an abrasion of the equalizer plate by the galling. In addition, thanks to a smooth sliding movement of the equalizer plate 29 on the bearing parts 26-1, an improved damping characteristic by the elastic deformations of the damper springs 28 under a fluctuation of the rotating movement is obtained. Finally, thanks to a prevention of a locally increased surface pressure, it is possible to evenly distribute the stresses as generated in the drive plate 26 as well as in the equalizer plate 29.

In contrast to the above explanation during the relative rotating movement in the counter clockwise direction a as shown in FIGS. 9 and 10, a rotating movement in the clockwise direction cause the spring retainers 38A now to engage with the respective end surfaces 26-1b of the bearing parts 26-1 of the drive plate 26, on one hand and, on the other hand, the opposite spring retainers 38B engage with the engaging parts 22-2 of the driven plate 22-1 extended out of the bearing parts 26-1, thereby compressing strongly the damper springs 28 in a manner that the equalizer plate 29 is deformed to the shape, which is symmetric with the shape 29' with regard to the central radial axis of the respective supporting parts 40, which, in the prior art in FIG. 9, would otherwise result in a local contact of the outer peripheral surface 26-1a of the bearing parts 26-1 at locations P' symmetric the location P with regard to the radial central axis of the bearing parts 26-1 and in an occurrence of galling abrasion at the edge points Q' symmetric with the edge points Q, which are also prevented in the present in the present invention due to the modified arrangement of the center c' of the curvature of the outer peripheral surface 26-1a' of the bearing parts 26-1 as shown in FIG. 10 to obtain a suitable clearance of the outer peripheral surfaces 26-1a' of the bearing parts 26-1 to obtain a substantial face-to-face contact with respect to the equalizer plate 29 as subjected to the deformation.

As a construction for obtaining a substantial face-to-face contact between the drive plate 26 and the equalizer plate 29, the circular shape of the outer peripheral surface 26-1a of the bearing parts 26-1 of the drive plate 26 having the radially outwardly spaced center of the curvature, i.e., the location of the surface 26-1a on the circular arc of a radius of a fixed value centered to the point C' as shown in FIG. 10 is desirable from view points of practices, including a machine designing and a machine manufacturing et al. The surface 26-1a is however not necessarily be shaped to conform to the arc on a circle of a fixed radius centered to the point C'. Namely, in order to obtain a substantial face-to-face contact of the drive plate 26 to the equalizer plate 29 as deformed under the dynamic condition, the outer peripheral surfaces 26-1a of the bearing parts 26-1 of the drive plate 26 may have modified shape such that a contact with the equalizer plate 29 is obtained at the central positions along the circumferential direction and such that that the more a position of the outer peripheral surface is spaced from the central position in the circumferential direction, the more it is displaced radially inwardly.

Figure 11A:
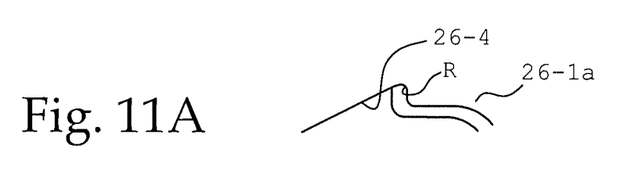
FIGS. 11A to 11C are enlarged views of FIG. 6 at a part designated by A, FIG. 11A and FIG. 11B illustrating prior arts, FIG. 11C illustrating the present invention.
Figure 11B:
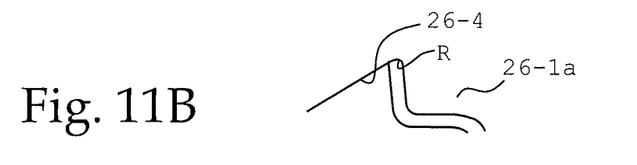
Figure 11C:
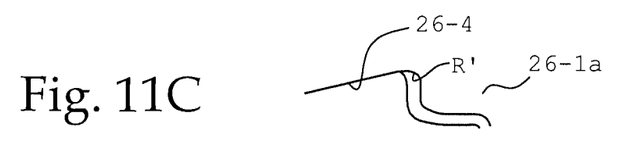

FIG. 11A is an enlarged view of a recessed part 26-4 in FIG. 6 at a region indicated by A as not yet improved by the present invention, which recessed part 26-4 is located adjacent to the upper surface 26-1a of the projected part. The reduced value of the radius of the curvature of the receiving part 26-1 of the present invention makes it possible that a vertical wall part of the drive plate 26 to the upper surface 26-1 of the projected part extends to a lowered position as shown in FIG. 2(b). As a result, a modified structure as shown in FIG. 2(c) can be obtained, where the value of the radius is increased from R to R' at the location connecting the recessed portion 26-4 to the vertical wall portion, which results in a reduction of a stress concentration at the recessed portion 26-4 as a structurally weak part.

EXPLANATION OF REFERENCE NUMERALS

10: Impeller Shell
12: Front Cover
15: Impeller
16: Turbine
17: Stator
18: Hub
21: Lockup Apparatus
22: Driven Plate (Outlet Side Rotating Member)
22-1: Radially Extended Part of Driven Plate
22-2: Spring Engaging Part of Driven Plate
26: Drive Plate (Inlet Side Rotating Member)
26-1: Bearing Part of Drive Plate
26-1$a$: Outer Peripheral Surface of Drive Plate (Prior Art)
26-1$a'$: Outer Peripheral Surface of Drive Plate (Present Invention)
26-1$b$: End Surface of Drive Plate in Circumferential Direction
28: Damper Spring
28A, 28B: Divided Part of Damper Spring
29: Equalizer Plate (Intermediate Member)
29': Equalizer Plate as Deformed
30: Piston Plate
32: Clutch Facing
38A, 38B: Spring Retainer
40: Supporting Part
C: Center of Rotating Movement of Equalizer Plate
C': Center of Curvature of Outer Peripheral Surface of Supporting Part of Drive Plate

The invention claimed is:

1. A lockup apparatus arranged between a piston plate and a hub in a torque converter, the lockup apparatus comprising:

an inlet rotating member fixed to the piston plate and having a plurality of circumferentially equally spaced bearing parts, each of the bearing parts forming an outer peripheral surface and a pair of circumferentially spaced end surfaces between which end surfaces the outer peripheral surface extends circumferentially; damper springs, each having a pair of divided parts connected in a direction of a rotating movement, the damper springs having paired ends arranged between opposed end faces of the bearing parts located adjacent in a circumferential direction of the inlet rotating member; an intermediate member having supporting parts extending between the divided parts of the respective damper springs, the intermediate member facing the outer peripheral surfaces of the bearing parts of the inlet rotating member and guided in a rotating manner by the bearing parts so as to obtain a rotating movement of the intermediate member in accordance with a deformation of the damper springs, and an outlet rotating member connected to the hub and having engaging parts extending between the end surfaces of the respective bearing parts of the inlet rotating member, the engaging parts effecting engagements with the damper springs in either rotating directions of the outlet rotating member so as to effect a power transmission from the inlet rotating member, a shape of the outer peripheral surface of each of the bearing parts of the inlet rotating member being such that the inlet rotating member makes a contact with an inner peripheral surface of the intermediate member at a central position along a circumferential direction and such that the more the outer peripheral surface is spaced from the central position in the circumferential direction, the further it is spaced radially inwardly with respect to a circle passing the central position, of which a central axis coincides with an axis of the rotating movement.

2. The lockup apparatus according to claim 1, wherein the outer peripheral surface of each of the bearing parts of the inlet rotating member forms a circular arc shape of a fixed radius and a central axis of a curvature of the circular arc shape is spaced radially outwardly from a central axis of an arc shape of the inner peripheral surface of the intermediate member.

* * * * *